United States Patent [19]

Conger

[11] 4,337,754
[45] Jul. 6, 1982

[54] SOLAR REFLECTOR AND HEAT STORAGE DEVICE

[76] Inventor: Steven J. Conger, P.O. Box 286, Snowmass, Colo. 81654

[21] Appl. No.: 140,503

[22] Filed: Apr. 14, 1980

[51] Int. Cl.³ .................................................. F24J 3/02
[52] U.S. Cl. .................................... 126/430; 126/417; 126/431; 126/439; 126/450; 350/263; 350/264
[58] Field of Search .............. 126/431, 430, 436, 400, 126/417, 444, 450, 439; 165/104 S, 48 S; 350/258, 259, 263, 264, 261

[56] References Cited

U.S. PATENT DOCUMENTS

| | | | |
|---|---|---|---|
| 2,288,465 | 6/1942 | Knudsen | 126/428 X |
| 2,595,905 | 5/1952 | Telkes | 126/419 |
| 3,285,333 | 11/1966 | Johnson, Jr. | 126/439 |
| 4,143,640 | 3/1979 | Pierce | 126/424 |
| 4,183,349 | 1/1980 | Frye | 126/439 |
| 4,212,289 | 7/1980 | Hebert | 126/428 |
| 4,220,137 | 9/1980 | Tesche et al. | 126/439 X |
| 4,227,774 | 10/1980 | Corll | 350/263 |
| 4,232,731 | 11/1980 | Kaplow et al. | 126/430 X |

*Primary Examiner*—Larry Jones
*Attorney, Agent, or Firm*—Townsend and Townsend

[57] ABSTRACT

A passive solar system is disclosed having a plurality of heat storage trays mounted adjacent to a window and arranged to absorb relatively low angled radiation and to reject relatively high angled radiation while providing a substantially unobstructed view through the window. The trays have their reflective upper surfaces angled toward the window and their absorptive lower surfaces angled toward the room. A phase change heat storage material is disposed between the upper and lower surfaces. In one configuration the lower surface is corrugated having one set of generally absorptive surface faces facing the reflective upper surface of an adjacent tray and having another set of generally emissive surface faces facing the interior of the room.

11 Claims, 5 Drawing Figures

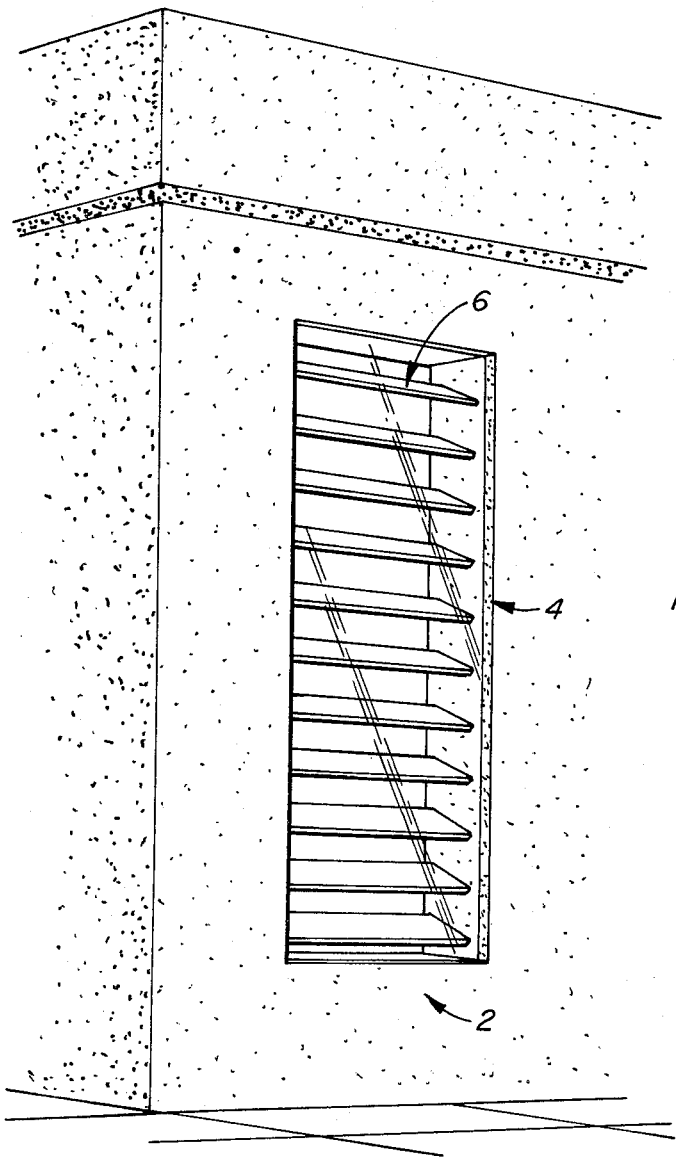
FIG._1.
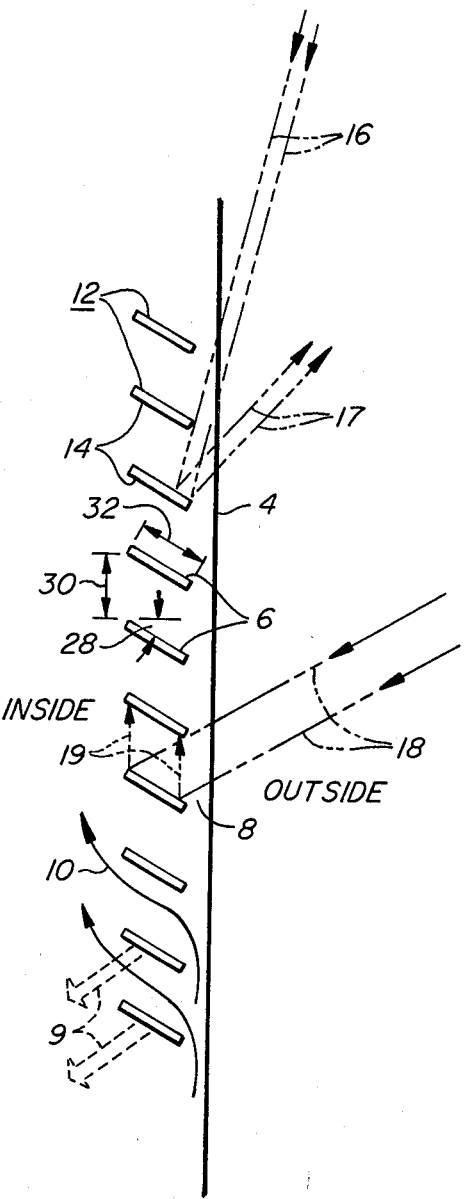
FIG._2.
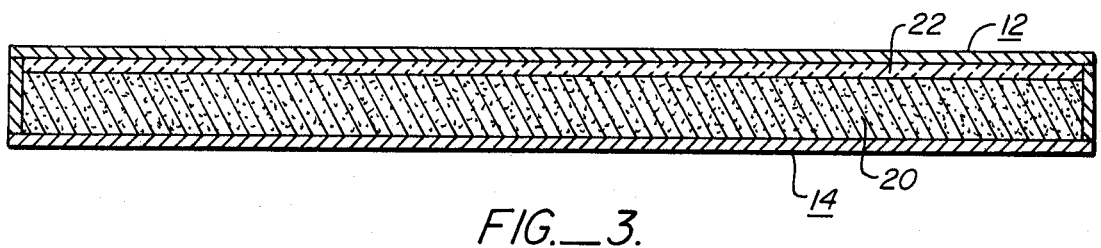
FIG._3.

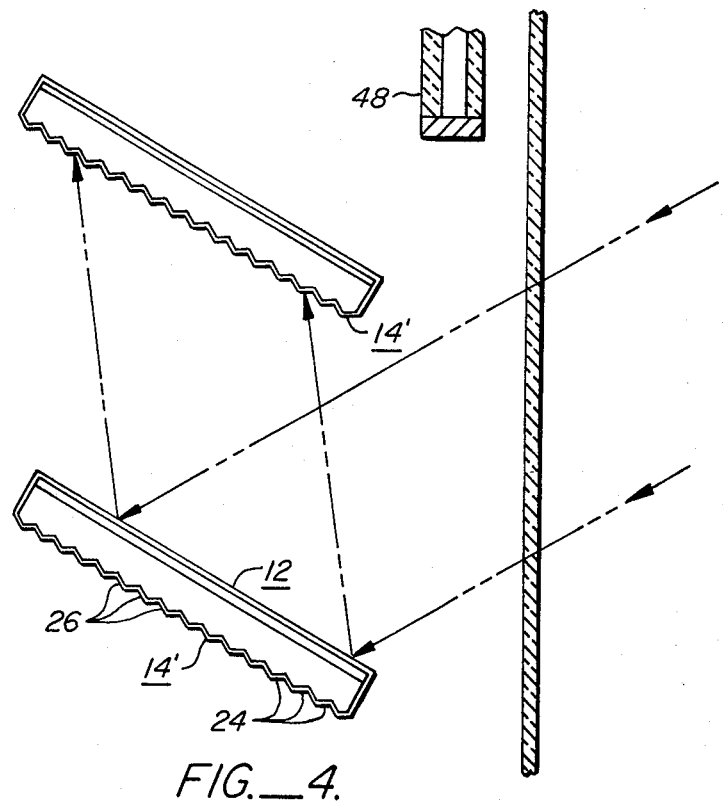
FIG.__4.
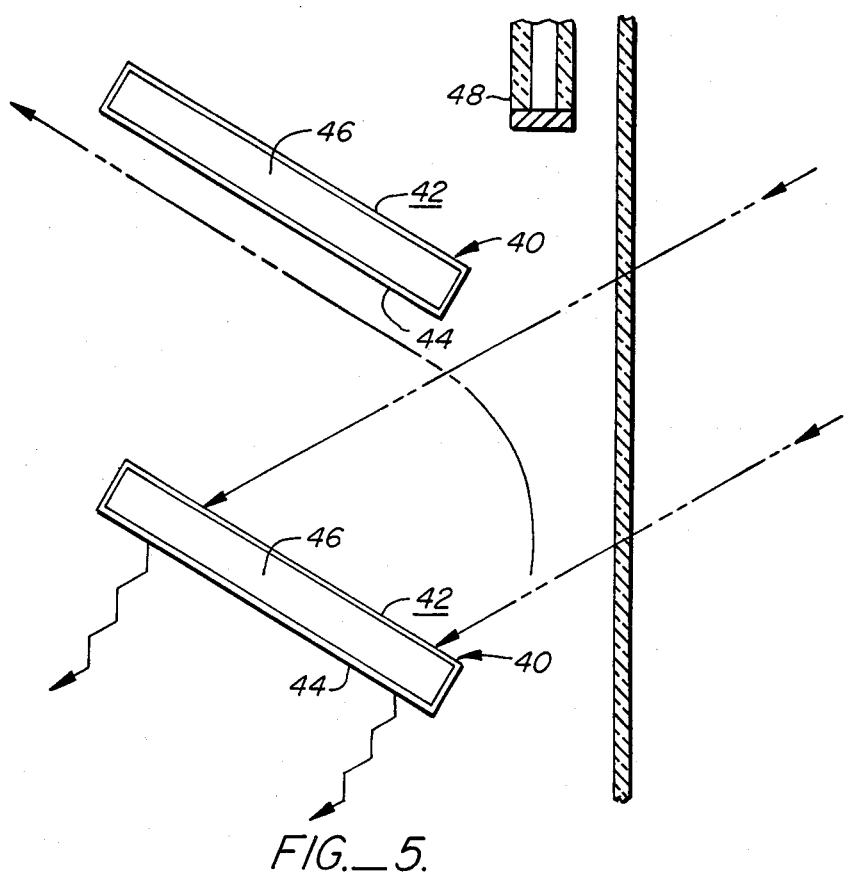
FIG.__5.

SOLAR REFLECTOR AND HEAT STORAGE DEVICE

This invention is a passive solar system particularly of the type which regulates and stores solar energy passing through a window.

BACKGROUND OF THE INVENTION

In recent years the need for alternatives to fossil fuels has become painfully apparent. Solar energy offers a particularly attractive source of energy because it is non-polluting and generally available. Solar energy is particularly suitable for heating homes and other structures. Because the supply of solar energy is periodic by nature, its use as a constant energy source depends on a system to store the energy during periods of high solar radiation. Several types of systems to store the insolation have been developed in the past. They have generally used water, crushed rock, concrete, or earth as a thermal storage medium. To reduce the bulk and increase the storage efficiency of these thermal storage reservoirs, systems based on the use of a phase change material have been developed because of the large quantities of heat absorbed as latent heat of fusion at constant temperature during melting or freezing. Such materials can store an enormous quantity of heat relative to their mass. They thereby reduce the physical size and weight of the heat reservoir.

One configuration for encapsulating phase change materials is in the form of cylindrical columns called energy rods. These rods have a low surface area to volume ratio and consequently they do not collect or distribute heat well. The heat storage tray system, the invention described below, allows for an improved surface to volume ratio for both collecting and redistributing heat. It also takes up less floor space and allows for greater view than energy rods used in an indirect gain design. The tray system also provides less temperature swing in the room than energy rods used in a direct gain design. The rods often have a tendency to buckle and shift position due to thermal expansion and contraction.

Another configuration for using energy absorbing, phase change materials is in generally planar ceiling tiles. Such tiles are primarily used for absorbing excess heat during the day and radiating the heat during the evening. It has been found that if sunlight passing through a window is reflected directly to heat absorbing panels on the ceiling, the space adjacent to the window becomes unuseable for two reasons. First, the path of the light, typically reflected by a type of Venetian blind, cannot be blocked as it passes toward the celing panels. Second, if people walk near the window they may have the sunlight reflected directly into their eyes causing extreme visual discomfort. A further problem is that the physical adjustments of the blinds is extremely critical so the performance of the system can be greatly impaired by the user.

Another type of solar heating apparatus includes a Venetian blind having slats which are reflective on one surface and absorptive on the opposite surface. By manipulating the angle of the slats, sunlight can be reflected back to the window during the summer or absorbed on the absorptive surface during the winter to heat the room. With such a system the angular adjustment of the Venetian blind is critical; thus the possibility for maladjustment is present. Also such movable apparatus can be relatively costly to produce and maintain. Since such a system demands constant adjustment, user acceptance may be low. Also when is it desired that sunlight be reflected back through the window, the view through the window is drastically reduced or even eliminated. Further, the absorptive surfaces on such Venetian blinds have a low thermal storage capacity; therefore such systems lack the ability to effectively dampen temperature fluctuations within the room because they cannot store daytime heat for nighttime redistribution to the room. In these systems useful heat must often be rejected because of room overheating.

SUMMARY OF THE INVENTION

The present invention solves many of the problems of the prior art by providing a plurality of relatively wide trays mounted adjacent to the window. The upper surfaces of the trays are angled towards the window and are reflective, the lower surfaces are absorptive. A heat storage material, preferably phase change material, is disposed between the upper and lower surfaces of each tray. The storage material stores heat absorbed by the absorptive surface for later release into the room. The resulting passive solar system both heats and cools the building while providing a substantially unobstructed view through the window. It simultaneously allows for indirect natural daylighting of the room.

In the preferred embodiment the heat collection trays are mounted adjacent to a window, the window preferably but not necessarily having a generally south facing exposure. The system is then designed to the particular location, as is more fully described below. The trays can be mounted either adjacent to a vertically standing window or adjacent to a window mounted at an angle, such as a skylight.

Each tray is provided with a planar, reflective, upper surface that is angled toward the window so that relatively high angled summer sunlight is reflected back through the window but relatively low angled winter sunlight is reflected from the upper surface of one tray to the opposed lower, absorptive surface of another tray located directly above. The phase change heat storage material disposed between the upper and lower surfaces of each tray stores most of the absorbed heat by being transformed from a solid to a liquid at about 80° F. during an endothermic reaction. the reflective top of each tray may be insulated from the heat storage material to reduce the loss of heat toward the window.

In a modification of the preferred embodiment the lower surface of each tray is provided with a corrugated configuration forming two sets of alternating surface faces. The first set of faces is disposed generally toward the window so that relatively low angled winter sunlight reflected from the upper surface of a tray directly beneath it impinges upon the absorptive first set of surface faces. The second set of surface faces is directed generally away from the window and toward the interior of the room and is characterized by high thermal emissivity. This permits the thermal energy to be absorbed by the first set of surface faces, stored in the heat storage material, and later transferred into the room by convection and by radiation by the second set of surface faces. Thermal radiation from the trays to the room occurs when the temperature in the room begins to drop thus causing the phase change material to transform from a liquid to a solid via an exothermic reaction.

The size, spacing and angular disposition of the typically rectangular trays mounted in front of the window are chosen to match the particular climate of that location. Thus, the system is designed taking into consideration the heat requirement, the latitude, and the incoming solar radiation, among other factors. After the size and spacing of the trays are calculated, the trays are installed in a fixed position adjacent to the window.

The trays are preferably mounted within brackets to allow them to be easily removed when desired. For example, during the fall or spring it may be desired to remove one or more trays because neither the heating nor cooling requirements are great. Also, if the window has an overhang, a number of the trays can be removed during the cooling season for a better view. The typically flat rectangular trays can be easily and compactly stored until their reinstallation is desired.

The trays are relatively wide compared to slats of Venetian blind type solar reflectors, and also have thermal mass and a heat redistribution system integral to them. Because of these factors and the special geometries in which they are arranged, the angle of the trays need not be changed regardless of the season. They are always in perfect adjustment. Further, due to the width of the trays, a substantial portion of the view through the window remains unobstructed during all seasons. This also makes possible natural daylighting for the space, saving energy normally needed for artificial lighting. This is often not possible with the use of mass walls or water walls for the storage system.

Since the present solar system rejects sunlight from the window during the summer and thus does not require an overhang for its proper operation, and because it is relatively lightweight, it is adaptable to be installed in virtually any southern facing windows, including those in existing buildings and mobile homes. Present passive solar systems such as mass or trombé walls and water walls often cannot be retrofitted into buildings because of their tremendous weight. Because approximately 70% of the buildings to be used in the year 2000 are already built, this invention expands greatly the possible use of solar energy for building heating and natural daylighting. The invention further helps to keep direct sunlight from fading furniture and rugs within the room, a problem with direct gain passive solar systems.

The thermal mass of the trays, that is the heat absorbing and releasing phase change material, is physically located between the sun and the interior of the room, an indirect gain system. Temperature fluctuations within the room are therefore reduced. This is a significant advantage compared to systems which have their heat storage materials on the ceiling or on the floor or otherwise not disposed between the radiant source and the heated space.

The system of the present invention heats the room by natural convection currents and by radiating thermal energy directly into the room from the lower surface of the trays. Cooling is achieved by reflecting sunlight from the upper surface of the trays back through the window, primarily during the summer. Because all of the elements, including the reflective surface, the absorption surface, the phase change heat storage material, and the radiative and convective heating, are integral parts of the tray, the total cost of the system is lowered. The system becomes self contained, easy to ship and relatively simple to install. The solar system of the present invention is therefore less costly to the user.

Other features and advantages of the invention will appear from the following description in which the preferred embodiment has been set forth in conjunction with the accompanying drawings.

BRIEF DESCRIPTION OF THE DRAWINGS

FIG. 1 is a perspective outside view of a building showing the trays of the preferred embodiment mounted in a window.

FIG. 2 is a diagrammatic side view representation of a series of trays and representative light paths during the summer and winter.

FIG. 3 is a cross-sectional side view of a tray.

FIG. 4 is a cross-sectional side view of two trays having a corrugated absorptive surface.

FIG. 5 is a cross-sectional view of two trays of an alternative embodiment of the invention.

DETAILED DESCRIPTION OF THE PREFERRED EMBODIMENTS

As seen in FIG. 1 a passive solar system 2 is mounted adjacent to a window 4 typically having a southern exposure. The louvered solar system has a plurality of heat collection trays 6 disposed in an overlying spaced relation at an angle to the window. The figure illustrates the relatively unobstructed view through the window retained with the present invention.

Turning now to FIGS. 2 and 3, trays 6 are mounted adjacent to the window in a conventional fashion to form a cavity 8 between the trays and the window. The cavity allows for the provision of an insulating shade to be used between the trays and the window, for example during winter nights. Top surfaces 12 are highly reflective of solar radiation while the bottom surfaces 14 are highly absorptive of solar radiation.

Relatively high angled summer sun is represented by rays 16 and 17. The trays are sized and positioned so that rays 16 impinging upon the top surfaces of the trays are reflected back through the window as indicated by rays 17. However, relatively low angled winter sunlight indicated by rays 18 and 19 is reflected from the top surface of one tray onto the bottom surface of the tray immediately above. The material covering the bottom surface of the trays is highly absorptive and absorbs solar radiation impinging thereon. The solar radiation, which is converted to heat by the absorptive lower surface, is stored within the panel, preferably by a phase change heat storage material 20. One based upon calcium chloride hexahydrate available from Dow Chemical Corporation has proven effective. The use of a phase change material, compared to other heat storage media, allows the tray to be much thinner and lighter for equivalent thermal capacity. An insulating layer 22 may thermally isolate the reflective top from the heat storage material to reduce heat losses through the reflective top. Heat is transferred from the tray to the room by radiation 9 from the lower surface and by natural convection currents, such as that in the direction of arrow 10 of FIG. 2. The trays become turning vanes which direct convection currents away from the window towards the room.

A modified lower absorptive surface 14' is shown in FIG. 4. Lower surface 14' has a corrugated or saw-toothed profile defining alternating first and second sets of surface faces 24, 26. Faces 24 are disposed in a first direction generally toward the top surface of the tray immediately below while faces 26 face a second direction generally away from the window and toward the interior of the room. Such surface disposition allows surface faces 24 to be characterized by high absorptivity to sunlight, for example in the range of 0.90-0.98, and low emissivity, for example less than 0.25. Such a selective surface can be obtained by such coating as black nickel and black chrome on copper. Surface faces 26 have a high thermal emissivity for radiating thermal energy into the room.

The corrugated configuration and selective absorptive and emissive surface characteristics enhance the thermal efficiency of the trays for two main reasons. First, the radiation strikes the lower surface at a lower incident angle improving absorption; second, heat is radiated more directly into the interior of the room as compared to a flat lower absorptive surface because the radiation surface faces the room more directly. Other surface configurations, such as arcuate, may also be used. Further, an insulating shade 48 or other additional temperature control means such as thin film optical shutters or heat mirrors (not shown) can also be used to complement the present invention.

Returning to FIG. 2, the angular tilt 28, the vertical spacing 30 and the width 32 of the trays are characteristics which can be changed so that the system can be tuned to the particular climate, the heating and cooling requirements, the insolation of the area, the occupancy and the latitude of the particular building. For example, at 40° N latitude trays having a width of 12", a vertical spacing of 6" and an angular tilt of 20° will result in the total capture of sunlight having an altitude of between 22° and 50°. Sunlight below 22° is partially captured, that is reflected from the upper surface of one tray to the lower surface of adjacent tray, and partially passes into the room. Sunlight above 50° begins to be reflected back out the window. However, for the same size tray having the same angular tilt but with a 4½ inch vertical separation, the total capture of sunlight is between 15° and 45° altitude. Thus, it is obvious that by varying the size, separation and tilt of the panels, the solar system can be installed to best suit the particular climate and needs of the user. In the preferred embodiment the panels, although removable, are not adjustable. However, if desired the user could adjustably mount the trays adjacent to the window. However, such a mounting means would increase the complexity and cost of the system.

The present solar system also enhances natural indirect lighting of the room in two ways. First the bottom of each tray is illuminated by the sun reflecting on the tray below it. This produces soft, natural lighting to the interior of the room. Second, daylighting occurs from the angular set of the panels which allows a high percentage of ground reflected light to enter the room. This ground reflected light is a significant factor during the winter when the ground is covered with snow. Such reflected light both heats and illuminates the room.

An alternative embodiment of the invention is shown in FIG. 5. Trays 40 are mounted similarly to the trays of the preferred embodiment discussed above. However, in this alternative embodiment top surface 42 is a highly absorptive surface while bottom surface 44 is a highly radiative surface. A phase change heat storage material 46 is disposed between the top and bottom surfaces and stores heat energy absorbed by the top surface. This embodiment may be advantageously used in the following two exemplary situations.

The first is where the high angled, summer sunlight does not enter the window and therefore is not a problem. This typically occurs when the windows are recessed or when the structure has a large overhang or awning shading the windows during the summer. In this situation the alternative embodiment can be used to prevent overheating caused by relatively low angled winter sunlight passing through the windows. The alternative embodiment also allows the storage of daytime solar heat for nighttime redistribution. A second situation in which the alternative embodiment may be desired is when heating is desired throughout the year, but it is also desired to dampen the temperature fluctuations which would normally occur from the sunlight passing through the window in the day. In either of the above situations, advantages accruing with the preferred embodiment, such as a substantially unimpeded view through the window, the placing the thermal mass between the window and the room, and the inherent simplicity of a completely passive system, are also present with the alternative embodiment.

The preferred embodiment and alternative embodiment have herein been shown and described. However, variation and modification may be made without departing from what is regarded as the subject of the invention.

I claim:

1. A solar energy collection and emission tray comprising:
    a reflective upper surface for reflecting impinging sunlight;
    an absorptive lower surface;
    a heat storage material disposed between said upper and lower surfaces; and
    said lower surface including first and second sets of alternating, divergently directed faces, said first set being a high absorptivity, low emissivity surface and said second set being highly emissive so that the thermal energy absorbed by said first set and stored by said heat storage material is emitted by said second set.

2. The solar tray of claim 1 wherein said heat storage material is a phase change heat storage material.

3. A passive solar system for use within a structure adjacent a window, comprising:
    a plurality of trays having a reflective upper surface for reflecting impinging sunlight passing into the structure through the window, and having an absorptive lower surface disposed opposite said upper surface;
    a heat storage material disposed between said upper and lower surfaces; and
    means for supporting said trays adjacent said window in a predetermined spaced relationship so that relatively high angled sunlight is reflected from the upper surface of a first tray back through said window thereby keeping said structure cool and relatively low angled sunlight is reflected onto the lower surface of a second tray situated above said first tray so that said reflected low angled sunlight is absorbed by the lower surface of said second tray and stored within said heat storage material of said tray for later emission by said lower surface, said trays sized and disposed so that a substantial portion of the view through said window is unobstructed by said trays;
    said lower surface of each of said plurality of trays including:
        first and second sets of alternating, divergently directed faces;
        said first set disposed in a first direction so that sunlight reflected from said upper surface of said first tray onto said lower surface of said second tray impinges upon said first set of faces, said first set being a high absorptivity, low emissivity surface; and said second set being highly emissive and disposed in a second direction away from said window so that the thermal energy absorbed by said first set and stored by said heat storage material is emitted by said second set into said structure.

4. The solar system of claim 3 wherein said heat storage material is a phase change material.

5. The solar system of claim 3 further comprising shade means for thermally insulating said structure movably disposed between said trays and said window.

6. The solar system of claim 3 wherein said trays are vertically disposed above one another adjacent to to a vertical window.

7. The solar system of claim 3 wherein said supporting means includes means for supporting said trays parallel to and spaced apart from said window.

8. The solar system of claim 3 wherein said upper surface is an insulated upper surface to restrict heat flow from said heat storage material through said upper surface.

9. The solar system of claim 3 wherein said reflective upper surface includes a light-scattering reflective upper surface.

10. A passive solar system for use adjacent to a window in a building, the window having a generally southern exposure, comprising:

a plurality of heat collection trays having a reflective upper surface for reflecting sunlight impinging thereon after said sunlight has passed into the building through the window, and having a lower surface opposite said upper surface;

a phase changing, heat storage material disposed between said upper and lower surfaces for storing thermal energy;

means for thermally insulating said heat storage material from said upper surface;

said lower surface further comprising a first set of surface faces disposed a first direction so that the light reflected from the upper surface of a first tray onto the lower surface of an overlying second tray impinges upon said first set, said first set having a high absorptivity low emissivity surface, and a second set of surface faces directed in a second direction generally away from said window and having high thermal emissivity characteristics so that thermal energy absorbed by said first set and stored in said phase change heat storage material is emitted by said second set of surface faces into the building;

means for supporting said trays adjacent to said window in a predetermined, overlying, spaced relationship, said trays being angularly disposed with reference to said window, generally parallel, and having said reflective upper surface generally facing said window at an angle thereto so that relatively high angled sunlight is reflected from the upper surface of the trays back through said window, thereby keeping said structure cool, and so that relatively low angled sunlight is reflected from the upper surface of said tray onto the lower surface of the tray immediately above so that said reflected low angled sunlight is absorbed by said first set of surface faces and stored within said heat storage material for emission into the building by said second set of surface faces, said trays sized and aligned so that a substantial portion of the view through said window is unobstructed by said trays.

11. The solar system of claim 10 wherein said trays are vertically aligned.

* * * * *